United States Patent Office 2,899,394
Patented Aug. 11, 1959

2,899,394
COMPOSITE ANTIOXIDANTS AND PROCESS OF PREPARATION THEREOF

Herbert Palfreeman, Newark, England, assignor to Imperial Chemical Industries Limited, London, England, a corporation of Great Britain No Drawing. Application November 28, 1955
Serial No. 549,549

Claims priority, application Great Britain
December 3, 1954

4 Claims. (Cl. 252—404)

This invention relates to the manufacture and application of new composite antioxidants.

In U.S. Patent 2,295,985 there is described a process for the manufacture of vulcanised rubber, which comprises vulcanizing rubber in a mixture comprising added sulphur, vulcanization accelerator and a bis-(2-hydroxy-3:5-dimethylphenyl)alkylmethane in which the alkyl radical has not more than 6 carbon atoms. The resulting vulcanised rubber has very good resistance to ordinary ageing and in the case of white or clear-coloured vulcanisates, is little if at all stained. The superiority of these antioxidants to other similar antioxidants of the prior art is described in the specification, which also stated that the antioxidants may be made by condensing 2:4-dimethylphenol with the appropriate aliphatic aldehyde in the presence of an acid condensing agent, e.g. hydrochloric or sulphuric acid.

In U.S. Patent 2,559,932 there are described mixtures of the said bis-(2-hydroxy-3:5-dimethylphenyl)alkylmethanes with the corresponding bis-(4-hydroxy-2:5-dimethylphenyl)alkylmethanes, which mixtures are obtained by condensing mixtures of 50–80% of 2:4-dimethylphenol and 50–20% of 2:5-dimethylphenol with the appropriate aliphatic aldehyde, and which not only possess the above-mentioned excellent properties of the antioxidants of U.S. Patent 2,295,985 but have the advantages of being more easily and economically manufactured and of being more readily dispersible in the rubber. They are more easily and economically manufactured because, whilst a mixture of 2:4- and 2:5-dimethylphenols substantially free from other phenols is readily isolated from tar acids by fractional distillation, the separation of these two dimethylphenols from each other cannot readily be effected by such physical means as fractional distillation. This is because their boiling points are almost identical, and in fact the only practicable methods of separation are chemical ones. Preferred antioxidants are described as those obtained by using n-butyraldehyde and by using mixture of 70–75% of 2:4-dimethylphenol and 30–25% of 2:5-dimethylphenol.

We have now found that if in the manufacture of antioxidants from certain mixtures of 2:4- and 2:5-dimethylphenols and n-butyraldehyde as above the reaction mixture is treated with a minor proportion of formaldehyde before isolating a higher yield of antioxidant is obtained and the antioxidant has improved properties.

More particularly, the said mixtures used in the present invention are mixtures of 2:4-dimethylphenol with one-half to one-quarter its weight of 2:5-dimethylphenol and if desired up to one-eighth its weight of coal-tar products boiling at about the same temperatures as the 2:4- and 2:5-dimethylphenols and 2 molecular proportions of these mixtures are treated with 0.8–1.3 molecular proportions of n-butyraldehyde in the presence of an acid condensing agent and then before isolating the antioxidant treated with 0.1–0.4 molecular proportions of formaldehyde.

The main action of the formaldehyde appears to be that of combining with unaltered 2:5-dimethylphenol to yield bis-(4-hydroxy-2:5-dimethylphenyl)methane.

The resulting antioxidants contain:

Bis-(2-hydroxy-3:5-dimethylphenyl)butane
Bis-(4-hydroxy-2:5-dimethylphenyl)butane
2:4'-dihydroxy-3:5:2':5'-tetramethyldiphenylbutane and
Bis-(4-hydroxy-2:5-dimethylphenyl)methane together with small proportions of other condensation products.

The antioxidants prepared in this manner are easier to handle than antioxidants prepared from the same raw materials with the omission of the formaldehyde treatment. The improvement is due to the higher melting-point of the formaldehyde treated product which allows it to be prepared in a stable free flowing physical form. The antioxidants are employed in rubber and rubber articles according to the usual methods. They may be mixed with the rubber or rubber latex along with other conventional ingredients and the resulting mixes cured by heat treatment or by treatment with sulphur monochloride in the cold.

The rubber may be natural or synthetic, the synthetic rubbers including, for example, polymers of butadiene-1:3, isobutene and 2-chlorobutadiene-1:3 and copolymers of these compounds with acrylonitrile, styrene, methyl methacrylate and other well known polymerisable compounds used in the manufacture of these rubbers.

The following examples in which parts are by weight illustrate but do not limit the invention:

Example 1

A mixture (122 parts) of 2:4- and 2:5-dimethylphenols (a commercial coal tar fraction consisting of essentially 60–70% of 2:4-dimethylphenol and 30–40% of 2:5-dimethylphenol) and 35% hydrochloric acid (22.4 parts) was stirred at 15–20° C., while n-butyraldehyde (40 parts) was added over 0.5 hour. After heating at 100–105° C. for 3 hours, the mixture was cooled to 70° C. and 37% formaldehyde (13 parts) added. After heating at 100–105° C. for a further 45 minutes, the product was washed acid-free with water and steam distilled at 130° C. under vacuum (100 mm. Hg) until all traces of low-boiling material had been removed.

145 parts of product were obtained. This is a yield of 99% calculated on the dimethylphenols. The product melted at 59.5° C. Without the formaldehyde the yield is only 90% and the melting point is 45° C.

The higher melting point obtained after treatment with formaldehyde is an advantage since it allows the antioxidant to be prepared in a stable, free-flowing physical form which facilitates the ease with which the antioxidant can be handled and incorporated with the rubber compound.

A rubber mix was prepared in the usual way containing 100 parts pale crepe natural rubber, 10 parts zinc oxide, 75 parts blanc fixe, 1 part stearic acid, 3 parts sulphur, 0.5 part diphenylguanidine and 1 part of the above antioxidant.

Sheets of the prepared compound were vulcanised for 75 minutes at 141° C. and ageing tests carried out on the vulcanisates. The results of the ageing tests were as follows:

Tensile strength (kg./cm.$^2$)
Unaged _____ 174
Aged in oxygen bomb at 70° C. and 300 p.s.i.:
    (i) For 8 days _____ 65
    (ii) For 12 days _____ 47
    (iii) For 16 days _____ 25

A rubber mix of identical composition but containing no antioxidant perished in less than 4 days when subjected to the ageing test.

These results show the valuable antiageing action of the antioxidant.

Two rubber mixes A and B were made up in the usual way containing the same amounts of pale crepe natural rubber, zinc oxide, stearic acid and blanc fixe with 10 parts titanium dioxide, 2 parts sulphur and 0.375 part zinc diethyldithiocarbamate. Mix B also contained 1 part of the antioxidant. Sheets were prepared by vulcanising for 12 minutes at 125° C. and a sample of each vulcanised sheet was exposed outdoors for 12 weeks. At the end of this time the samples were both cream tinted showing that the antioxidant has no staining effect.

*Example 2*

As an illustration of the use of the antioxidants in synthetic rubbers the following mix was made up:

| | Parts |
|---|---|
| Neoprene GN | 100 |
| Magnesium oxide | 4 |
| Stearic acid | 0.5 |
| China clay | 25 |
| Whiting | 25 |
| Petroleum jelly | 2 |
| Pale cumar resin | 8 |
| Titanium dioxide | 15 |
| Zinc oxide | 5 |
| Antioxidant of Example 1 | 1 |

Cure was effected at 153° C. for 30 minutes.

*Example 3*

As an illustration of the use of the antioxidants in latices the following mix was made up:

| | Parts |
|---|---|
| 60% natural rubber latex | 167 |
| 20% aqueous solution of cetyl alcohol-ethylene oxide condensation product | 1 |
| 50% aqueous dispersion of sulphur | 2 |
| 50% aqueous dispersion of zinc oxide | 3 |
| 50% aqueous dispersion of zinc diethyl dithiocarbamate | 2 |
| 25% aqueous dispersion of the antioxidant of Example 1 | 4 |

Cure was for 45 minutes at 100° C.

What I claim is:

1. A process for preparing composite antioxidants which comprises condensing in the presence of an acidic condensation agent 0.8 to 1.3 molecular proportions of n-butyraldehyde with 2 molecular proportions of a mixture comprising 2:4-dimethylphenol and 2:5-dimethylphenol, said 2:5-dimethylphenol being present in said mixture in an amount from one-quarter to one-half of the weight of said mixture, and then condensing the resulting reaction mixture with 0.1 to 0.4 molecular proportion of formaldehyde, followed by isolation and recovery of the product.

2. The composite antioxidant product formed by the process of claim 1.

3. A process according to claim 1 wherein up to one-eighth of the weight of said mixture comprises coal tar distillation products, boiling at the same temperatures as the said phenols.

4. A process according to claim 3 wherein said mixture comprises 60 to 70% of 2:4-dimethylphenol and 30 to 40% of 2:5-dimethylphenol.

References Cited in the file of this patent
UNITED STATES PATENTS

| 2,559,932 | Briggs et al. | July 10, 1951 |
| 2,692,835 | Capell et al. | Oct. 26, 1954 |